US012691733B2

(12) United States Patent
Harnischfeger

(10) Patent No.: US 12,691,733 B2
(45) Date of Patent: Jul. 28, 2026

(54) ROOF ARRANGEMENT HAVING A LINER ELEMENT

(71) Applicant: Webasto SE, Stockdorf (DE)

(72) Inventor: Bernhard Harnischfeger, Stockdorf (DE)

(73) Assignee: WEBASTO SE, Stockdorf (DE)

( * ) Notice: Subject to any disclaimer, the term of this patent is extended or adjusted under 35 U.S.C. 154(b) by 496 days.

(21) Appl. No.: 18/041,311

(22) PCT Filed: Aug. 5, 2021

(86) PCT No.: PCT/EP2021/071892
§ 371 (c)(1),
(2) Date: Feb. 10, 2023

(87) PCT Pub. No.: WO2022/033957
PCT Pub. Date: Feb. 17, 2022

(65) Prior Publication Data
US 2023/0347719 A1     Nov. 2, 2023

(30) Foreign Application Priority Data

Aug. 13, 2020     (DE) ..................... 10 2020 121 313.1

(51) Int. Cl.
*B60J 1/00*          (2006.01)
*B60R 13/02*        (2006.01)
(Continued)

(52) U.S. Cl.
CPC ........... *B60J 1/006* (2013.01); *B60R 13/0212* (2013.01); *B60R 13/0231* (2013.01); *B62D 25/06* (2013.01); *B62D 29/043* (2013.01)

(58) Field of Classification Search
CPC ........... B60R 13/0212; B60R 13/0218; B60R 13/0225; B60R 13/0231; B62D 25/06; B60J 1/006
(Continued)

(56) References Cited

U.S. PATENT DOCUMENTS 5,280,991 A * 1/1994 Weiland .............. B60R 13/0231
                                                                    296/214
5,664,827 A * 9/1997 Mori ........................ B60J 10/82
                                                                    296/213
(Continued)

FOREIGN PATENT DOCUMENTS

DE          10039522 A1     2/2002
DE          10155170 A1     5/2003
(Continued)

OTHER PUBLICATIONS

Computer translation of WO 2020/038932 (Year: 2020).*
(Continued)

*Primary Examiner* — Gregory A Blankenship
(74) *Attorney, Agent, or Firm* — Fitch, Even, Tabin & Flannery, LLP

(57)          ABSTRACT
A roof arrangement of a motor vehicle, the roof arrangement having a fixed roof element which is disposed rigidly and so as to not be displaceable with respect to a roof substructure and comprises a flat glass or plastic panel, and the roof arrangement having a headliner having a liner element, which forms an inner viewing area and which is connected to the fixed roof element. The fixed roof element has a mold portion manufactured according to a foaming process or injection molding process which is molded onto the glass or plastic panel and on which a fastening geometry is molded, to which the liner element is fastened.

10 Claims, 2 Drawing Sheets

(51) Int. Cl.
 B62D 25/06 (2006.01)
 B62D 29/04 (2006.01)
(58) Field of Classification Search
 USPC .............................. 296/214, 216.01, 216.07
 See application file for complete search history.

(56) References Cited

U.S. PATENT DOCUMENTS

| | | | | |
|---|---|---|---|---|
| 6,120,091 A * | 9/2000 | Reich | ...................... B60R 11/02 | 296/214 |
| 6,375,253 B1 * | 4/2002 | Verkaik | .................... B60J 7/022 | 296/214 |
| 6,378,936 B1 * | 4/2002 | Grimm | .............. B60R 13/0206 | 296/210 |
| 7,261,591 B2 * | 8/2007 | Korsunsky | .......... H01R 12/727 | 439/541 |
| 2002/0021029 A1 | 2/2002 | Bohm | | |
| 2003/0057739 A1 * | 3/2003 | Lutz | ........................ B29C 43/42 | 296/214 |
| 2004/0094992 A1 | 5/2004 | Bohm et al. | | |
| 2004/0207225 A1 * | 10/2004 | Billarant | ............. B60R 13/0212 | 296/39.1 |
| 2005/0006929 A1 * | 1/2005 | Senoo | ................. B60R 13/0231 | 296/214 |
| 2007/0063539 A1 * | 3/2007 | DiMario | .................. B60J 1/006 | 248/216.4 |
| 2008/0100100 A1 * | 5/2008 | Huisman | .............. B62D 29/043 | 29/897 |
| 2008/0106124 A1 * | 5/2008 | Snider | .................... B60J 7/0015 | 296/215 |
| 2008/0258507 A1 * | 10/2008 | Dykman | ............. B60R 13/0231 | 296/216.07 |
| 2008/0272625 A1 | 11/2008 | Paetz et al. | | |
| 2009/0194978 A1 * | 8/2009 | Miura | ................... B60R 21/214 | 280/728.2 |
| 2010/0024328 A1 * | 2/2010 | Bissinger | ................. B60J 1/006 | 403/338 |
| 2013/0038091 A1 | 2/2013 | Schroferl | | |
| 2013/0278010 A1 * | 10/2013 | Kreye | ...................... B60J 10/70 | 296/146.15 |
| 2014/0191540 A1 * | 7/2014 | Brown | ................ B60R 13/0231 | 296/214 |
| 2014/0265456 A1 * | 9/2014 | Huelke | .............. B60R 13/0231 | 296/214 |
| 2018/0056893 A1 * | 3/2018 | Bumgarner | ........... F16B 21/086 | |
| 2021/0261199 A1 | 8/2021 | Schluse et al. | | |
| 2022/0218074 A1 * | 7/2022 | Ono | .................... B60R 13/0212 | |
| 2023/0347719 A1 * | 11/2023 | Harnischfeger | ....... B62D 29/04 | |
| 2025/0050822 A1 * | 2/2025 | Zunzer | ............... B60R 13/0212 | |

FOREIGN PATENT DOCUMENTS

| | | | | |
|---|---|---|---|---|
| DE | 10155170 | B4 | 8/2004 | |
| DE | 102004007988 | A1 | 9/2005 | |
| DE | 102009052090 | A1 * | 5/2010 | ............. B60J 1/006 |
| DE | 102011013819 | B3 | 5/2012 | |
| DE | 102016100772 | A1 | 7/2017 | |
| EP | 1384655 | A2 | 1/2004 | |
| EP | 1384655 | A3 | 6/2004 | |
| EP | 1559600 | A2 | 8/2005 | |
| WO | 2006034734 | A2 | 4/2006 | |
| WO | 2006034734 | A3 | 1/2007 | |
| WO | WO-2020038932 | A1 * | 2/2020 | ............. B62D 29/00 |
| WO | WO-2023202845 | A1 * | 10/2023 | ............... B60J 1/00 |

OTHER PUBLICATIONS

International Search Report for PCT/EP2021/071892 mailed Nov. 9, 2021, in German and English (7 pages).
International Preliminary Report on Patentability from a related Patent Application No. PCT/EP2021/071892; mailed Feb. 7, 2023 (In English and German, 6 pages).
Office Action issued in corresponding German Application No. 102020121313.1; mailed Mar. 2, 2026; In German with English machine translation (12 pages).

* cited by examiner

ROOF ARRANGEMENT HAVING A LINER ELEMENT

CROSS-REFERENCE TO RELATED APPLICATIONS

This application is a U.S. national phase application filed under 35 U.S.C. § 371 of International Application No. PCT/EP2021/071892, filed Aug. 5, 2021, designating the United States, which claims priority from German Patent Application Number 10 2020 121 313.1, filed on Aug. 13, 2020, which are hereby incorporated herein by reference in their entirety for all purposes.

FIELD

The invention relates to a roof arrangement of a motor vehicle having the features of the preamble of patent claim 1.

BACKGROUND

A roof arrangement of this kind is known from practice and forms, for example, a fixed roof formed as a panoramic roof, which is provided with a transparent glass or plastic panel through which ambient light can enter into an interior of the respective motor vehicle. The glass or plastic panel has a circumferential edge foam, which is in particular made of a polyurethane material and which can be used for sealing against adjoining outer skin sections. Furthermore, the known roof arrangement comprises a headliner having a liner element, which forms an inner viewing area of the roof arrangement visible from the vehicle interior. To provide the roof arrangement with a harmonious appearance on its inside, an edge of the liner element abuts on the glass or plastic panel. The fastening is effected by means of a clamp which is engaged at a counterelement, which is glued to the glass or plastic panel. Specific components are required for this, which in turn affects the cost of the roof arrangement.

A roof arrangement which comprises a roof panel having an edge foam is known from patent document DE 101 55 170 B4, for example.

SUMMARY

The object of the invention is to provide a roof arrangement of the kind described above which is characterized by a simplified fastening of the liner element to the fixed roof element.

According to the invention, this object is attained by the roof arrangement having the features of patent claim 1.

According to the invention, a roof arrangement of a motor vehicle is proposed which comprises a fixed roof element, which is disposed rigidly and so as to not be displaceable with respect to a roof substructure and comprises a flat glass or plastic panel, and the roof arrangement comprising a headliner having a liner element, which forms an inner viewing area and which is connected to the fixed roof element. The fixed roof element has a mold portion manufactured according to a foaming process or injection molding process which is molded onto the glass or plastic panel and on which a fastening geometry is molded, to which the liner element is fastened. By means of the mold portion, fasteners are disposed in a direct manner on the fixed roof element, the liner element being fastenable to said fasteners without requiring additional fastening parts, such as clamps or the like. The liner element must simply be brought into engagement only with the fastening geometry of the mold portion.

The mold portion of the roof arrangement according to the invention is basically a plastic element of the fixed roof element which is produced according to a molding process, such as a foaming process or an injection molding process, and which is thus molded in a corresponding cavity of a mold and which is molded onto the glass or plastic panel in the foaming process or injection molding process. The mold for producing the mold portion is formed as a RIM (reaction injection molding) mold, for example. Preferably, a polyurethane material is used for molding the mold portion.

The plastic mold portion, which is molded on the glass or plastic panel, can be molded circumferentially or only in defined areas of the fixed roof element. In the case of a circumferential mold portion, the fastening geometry can be formed only locally or circumferentially in a corresponding manner.

In a specific embodiment of the roof arrangement according to the invention, the liner element is in engagement with the fastening geometry, the liner element in particular engaging in the fastening geometry.

In a preferred embodiment of roof arrangement according to the invention, the fastening geometry comprises a groove. Fastening the respective liner element is carried out by inserting a liner element edge or the like in this groove.

To fasten the liner element in the groove in such a manner that it cannot be pulled out, the groove has an undercut in a specific embodiment of the roof arrangement according to the invention.

To optimize the interaction between the fastening geometry of the mold portion and the liner element, it is advantageous if the liner element has a fastening structure, which engages in the fastening geometry of the mold portion and which is formed complementary to this fastening geometry.

For example, the fastening structure comprises an edge beading, by means of which the edge of the liner element is thickened, which, in turn, engages in the groove, which forms the fastening geometry of the mold portion.

In an embodiment of the roof arrangement according to the invention which meets high design standards, the mold portion is disposed on a lower surface of the glass or plastic panel and is molded onto the glass or plastic panel in a form-fitting manner.

Advantageously, the glass or plastic panel of the roof arrangement according to the invention also has an edge foaming which is preferably made of a polyurethane material. The edge foaming and the mold portion can be molded onto the glass or plastic panel in one manufacturing step in one mold, in particular the edge foaming and the mold portion being formable from the same material.

The mold portion, on which the fastening geometry for the liner element is formed, can be formed integrally with edge foaming or be a component of the edge foam.

In an alternative embodiment of the roof arrangement according to the invention, the mold portion is spaced apart from the edge foaming, at least in sections.

The fixed roof element is glued to the roof substructure via a glue bead, for example. If there is a space between the edge foaming and the mold portion, the glue bead is preferably disposed in this space. This area is covered by the headliner on the inside of the roof arrangement and is thus not visible from the vehicle interior.

Further advantages and advantageous embodiments of the object of the invention can be derived from the description, the drawing and the patent claims.

BRIEF DESCRIPTIONS OF THE DRAWINGS

An embodiment of a roof arrangement according to the invention is illustrated schematically simplified in the drawing and is described in more detail hereinafter.

DETAILED DESCRIPTION

Figure 1:
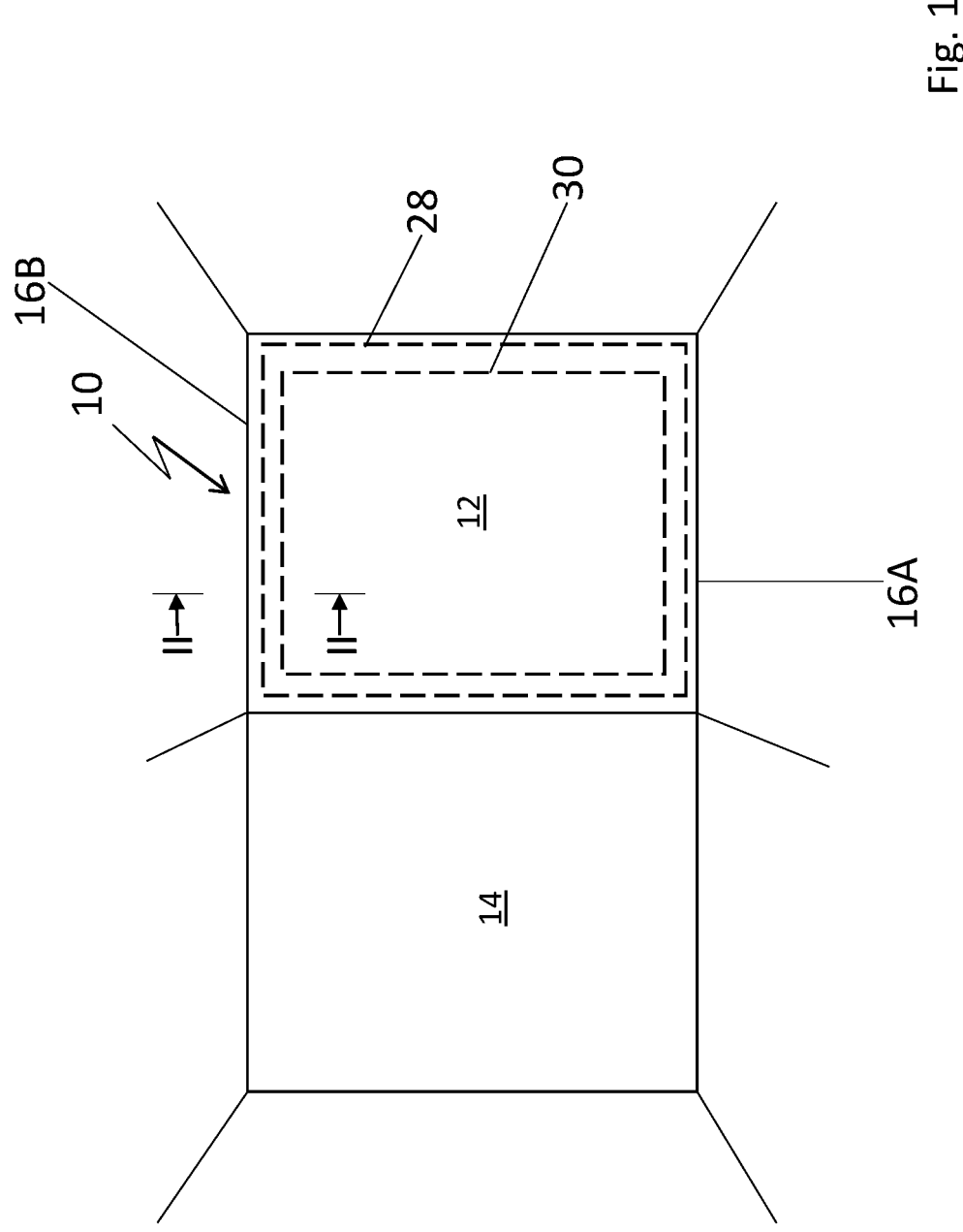
FIG. 1 shows a top view of a roof arrangement according to the invention.
Figure 2:
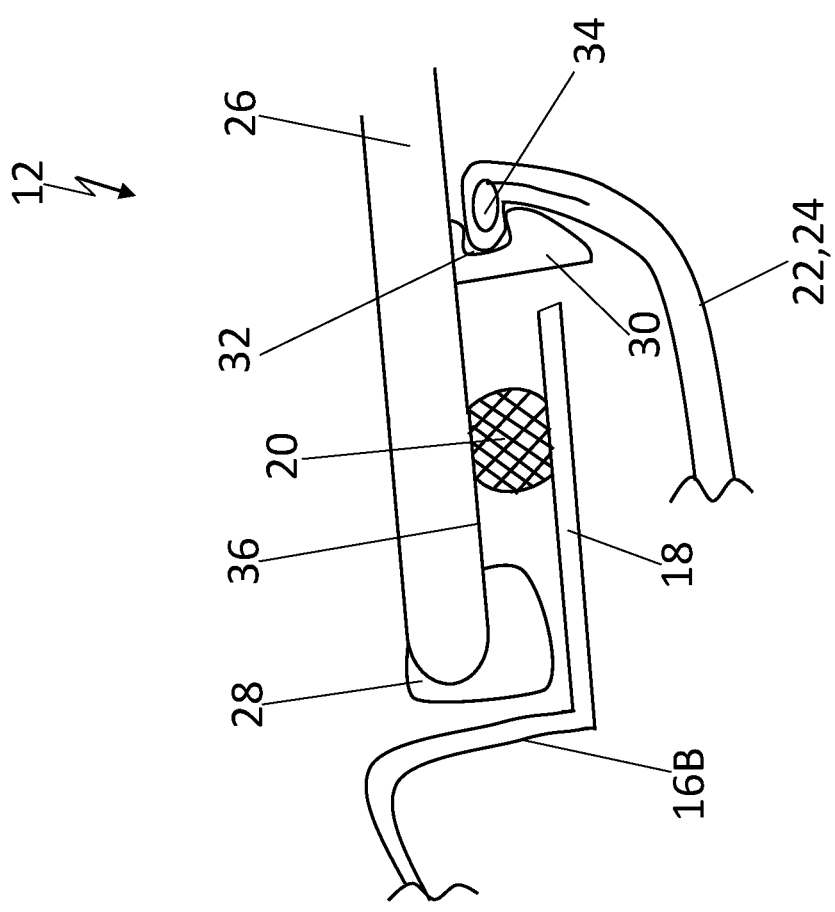
FIG. 2 shows a cut through the roof arrangement according to FIG. 1 along the line II-II in FIG. 1.

The drawing shows a roof arrangement 10 of a motor vehicle which covers an interior of the motor vehicle and is thus disposed above the sitting area for vehicle occupants. Roof arrangement 10 comprises a fixed roof element 12, which is disposed rigidly and so as to not be displaceable with respect to a vehicle body and with respect to a roof substructure, and a moveable lid element 14, which is a component of a roof opening system and which can be displaced between a closed position, in which a roof opening is closed, and an open position, in which the roof opening is at least partly open, by means of displacement kinematics (not shown). In addition to fixed roof element 12 and lid element 14, roof arrangement 10 comprises roof side rails 16A and 16B, which, in particular in the area of fixed roof element 12, each form a bearing flange 18 on which fixed roof element 12 rests via a glue bead 20 and which is associated with/assigned to a roof substructure.

Alternatively, roof arrangement 10 can be formed without roof opening systems, in which case preferably a fixed roof element extending over the area of the roof arrangement being provided which is disposed rigidly and so as to not be displaceable with respect to a roof substructure.

To provide the inner surface of roof arrangement 10 facing the vehicle interior with a favorable optical appearance, roof arrangement 10 has a headliner 22 having a liner element 24 formed from a stretchable material.

Fixed roof element 12 comprises a glass panel 26 which is essentially transparent and which is provided with an edge foaming 28 molded from a polyurethane material at its circumferential edge.

Spaced apart from edge foaming 28, glass panel 26 has a mold portion 30 on its lower surface, said mold portion 30 being formed frame-like or circumferential, as can be seen from the dashed line in FIG. 1, and being molded from the polyurethane material from which edge foaming 28 is also formed.

On its side facing a central area or center of glass panel 26, mold portion 30, which forms a rib protruding downward, has a groove 32 which forms a fastening geometry for liner element 24 of headliner 22.

To be able to fasten liner element 24 to mold portion 30, it has a fastening structure 34 which is formed in the manner of an edge beading at least approximately corresponding to the shape of groove 32 and which engages in groove 32 of mold portion 30. Further elements for fastening liner element 24 to fixed roof element 12 or the fastening geometry of mold portion 30 are not provided.

Between edge foaming 28 and mold portion 30, an intermediate area 36 is located in which glue bead 20 is disposed, which connects fixed roof element 12 or glass panel 26 to bearing flange 18 of respective roof side rail 16A or 16B.

The invention claimed is:

1. A roof arrangement of a motor vehicle, the roof arrangement comprising:
a fixed roof element which is disposed rigidly and so as to not be displaceable with respect to a roof substructure and comprises a flat glass or plastic panel, and
the roof arrangement comprising a headliner having a liner element, which forms an inner viewing area and which is connected to the fixed roof element,
wherein the fixed roof element has a mold portion manufactured according to a foaming process or injection molding process which is molded onto the glass or plastic panel and on which a fastening geometry is molded, to which the liner element is fastened,
wherein the glass or plastic panel has an edge foaming at its circumferential edge, and
wherein the mold portion is molded from a polyurethane material from which the edge foaming is also formed.

2. The roof arrangement according to claim 1, wherein the liner element is in engagement with the fastening geometry.

3. The roof arrangement according to claim 1, wherein the fastening geometry comprises a groove.

4. The roof arrangement according to claim 3, wherein the groove has an undercut.

5. The roof arrangement according to claim 1, wherein the liner element has a fastening structure, which engages in the fastening geometry of the mold portion.

6. The roof arrangement according to claim 5, wherein the fastening structure comprises an edge beading.

7. The roof arrangement according to claim 1, wherein the mold portion is disposed on a lower surface of the glass or plastic panel.

8. The roof arrangement according to claim 1, wherein the mold portion is spaced apart from the edge foaming.

9. The roof arrangement according to claim 1, wherein the glass or plastic panel is glued to the roof substructure via a glue bead in an area between the edge foaming and the mold portion.

10. A roof arrangement of a motor vehicle, the roof arrangement comprising:
a fixed roof element which is disposed rigidly and so as to not be displaceable with respect to a roof substructure and comprises a flat glass or plastic panel, and
the roof arrangement comprising a headliner having a liner element, which forms an inner viewing area and which is connected to the fixed roof element,
wherein the fixed roof element has a mold portion manufactured according to a foaming process or injection molding process which is molded onto the glass or plastic panel and on which a fastening geometry is molded, to which the liner element is fastened,
wherein the mold portion is formed frame-like,
wherein the glass or plastic panel has an edge foaming at its circumferential edge,
wherein the mold portion is molded from a polyurethane material from which the edge foaming is also formed, and
wherein the frame-like mold portion is formed circumferentially.

* * * * *